United States Patent [19]
Enabnit

[11] 3,742,477
[45] June 26, 1973

[54] CONVEYOR BELT CONDITION MONITORING APPARATUS

[75] Inventor: Robert S. Enabnit, Akron, Ohio

[73] Assignee: The Goodyear Tire and Rubber Company, Akron, Ohio

[22] Filed: Sept. 9, 1971

[21] Appl. No.: 178,868

[52] U.S. Cl. .................. 340/259, 198/232, 331/65
[51] Int. Cl. ......................................... G08b 21/00
[58] Field of Search .................... 340/259; 198/203; 331/64, 65

[56] References Cited
UNITED STATES PATENTS

| | | | |
|---|---|---|---|
| 3,636,436 | 1/1972 | Kurauchi et al. | 340/259 X |
| 3,651,506 | 3/1972 | Olaf et al. | 340/259 |
| 2,649,955 | 8/1953 | Buckeridge et al. | 198/203 |

Primary Examiner—David L. Trafton
Attorney—F. W. Brunner et al.

[57] ABSTRACT

Apparatus for monitoring the open-circuited or close-circuited condition of an electrical conductor associated with a moving conveyor belt to provide a fail-safe indication of the condition of the belt. The monitoring apparatus comprises a detector circuit including an oscillator having a pair of magnetically coupled coils whose position relative to the moving conductors on the belt results in a change in the oscillator output each time a close-circuited conductor passes proximate to the pair of coils. The change effected in the oscillator signal is detected and provides a signal to an indicator circuit that is adapted to show both the safe and unsafe condition of the belt and provides shut-down of the power to the belt driving means in the event a tear or other damage occurs in the belt.

13 Claims, 8 Drawing Figures

Patented June 26, 1973

FIG. 3 DETECTOR OSCILLATOR OUTPUT

FIG. 4 CONDITIONED OUTPUT FROM DETECTOR CIRCUITRY

FIG. 5 HOLDING SIGNAL TO RELAY DRIVER

RELAY DROP-OUT THRESHOLD

INVENTOR.
ROBERT S. ENABNIT
BY
*P. Milliken*
ATTORNEY

Patented June 26, 1973

INVENTOR.
ROBERT S. ENABNIT

BY *P. Milliken*

ATTORNEY

CONVEYOR BELT CONDITION MONITORING APPARATUS

This invention relates to a detector for indicating when a tear, misalignment or other damage occurs in a conveyor belt and includes a means to turn off the drive motor of the belt to prevent further damage.

BACKGROUND OF THE INVENTION

In the past, it has been a common problem, particularly with heavy-duty conveyor belts which transport bulk materials such as metallic ore and the like, that sharp edges of the material may tend to become lodged in such a position that they will cause longitudinal slitting or tearing of the belt. When such a tear occurs, if the belt is not stopped within a short time, the tear can continue along the length of the belt and thereby damage extremely long lengths of the belt which could otherwise be saved if the belt could be stopped as soon as a cut or tear starts to occur. There is also the problem of lateral misalignment which may occur and which can damage the belt if not corrected.

OBJECTS OF THE INVENTION

It is a primary object of this invention to provide a belt damage detector which will rapidly determine when a cut or tear has occurred in a moving belt and quickly and automatically will stop the belt before the tear extends along a greater length of the belt.

Another object of this invention is to provide a belt damage detector which is failsafe and which is not adversely affected by the environment surrounding the belt.

A still further object of the invention is to detect any adverse misalignment of the belt and stop the belt before damage can occur.

These and other objects of the invention will become more fully apparent as the description proceeds in the following specification and the accompanying drawings.

DESCRIPTION OF THE PREFERRED EMBODIMENTS

Figure 1:
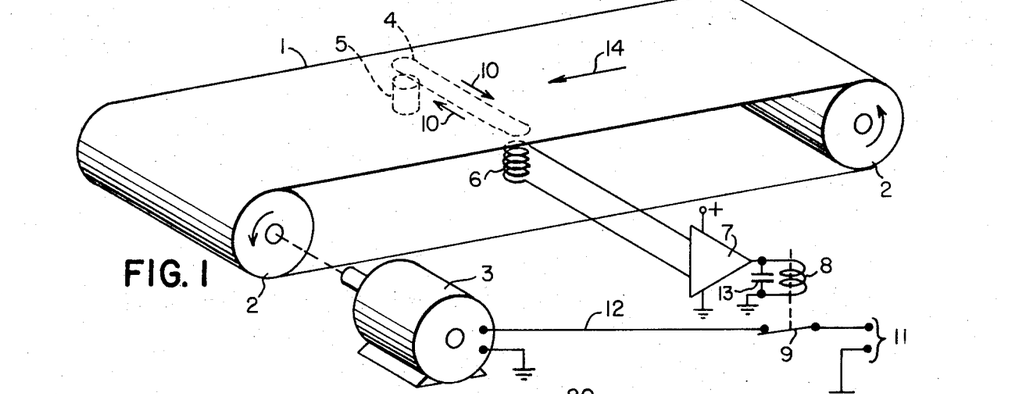
FIG. 1 is a simplified perspective view showing one embodiment of the invention.

Referring now to FIG. 1 of the drawings, the numeral 1 indicates an endless conveyor belt supported by a plurality of rollers 2 at least one of which is driven by a drive motor 3. Embedded within the belt and running transversely thereacross is an electrically conductive closed loop 4 made of metallic wire or other suitable material. A fixed permanent magnet 5 is positioned beneath the belt adjacent one end of the loop 4 and a detector pick-up coil 6 is positioned beneath the belt adjacent the opposite end of the loop 4. The coil 6 is connected to a detector amplifier 7, the output of which operates a relay 8 which holds a switch 9 in a closed position so long as charge is maintained in the capacitor 13. This charge is produced when an induced current indicated by the arrows 10 is flowing in the sensor loop 4. The switch 9, when in the closed position, permits current from a power source 11 to flow through a line 12 to operate the drive motor 3 which drives the belt 1 in the direction shown by the arrow 14. The current flow in the loop 4 is induced by the movement of the belt 1 which causes the loop 4 to periodically pass across the magnet 5. As the belt with the loop 4 therein moves past the magnet 5, the affect is that of an electrical current generator so long as the loop 4 is not broken by a tear, cut or other damage to the belt 1. For the purpose of simplicity, only one sensor loop 4 has been shown in the belt. In actual practice, a plurality of sensor loops could be used spaced at equal intervals from each other.

Figures 2, 3:
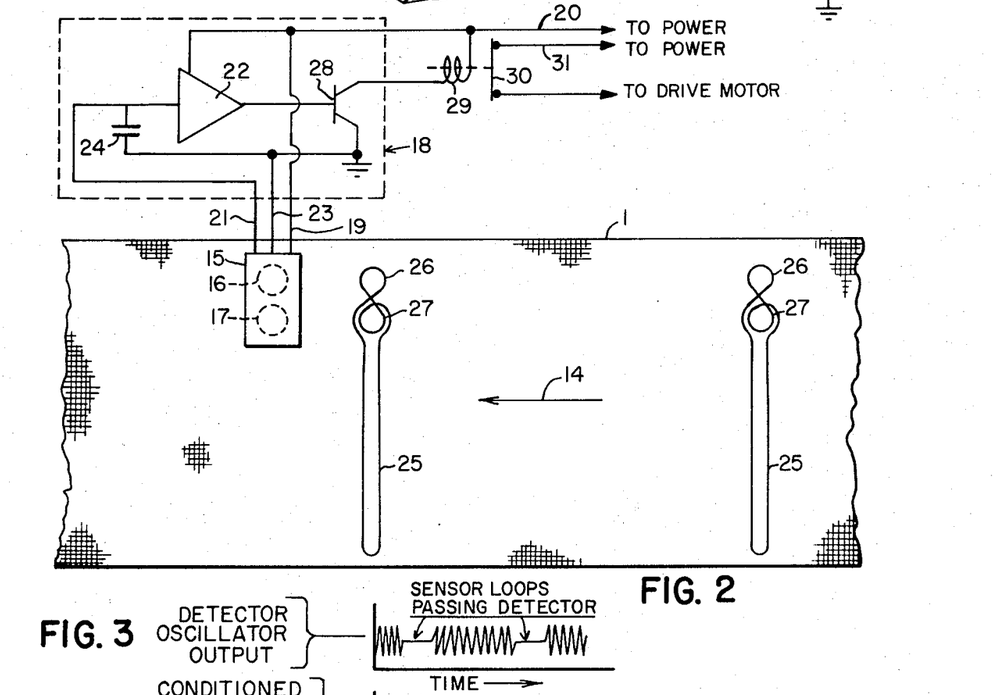
FIG. 2 is a simplified diagrammatic view showing another embodiment of the invention.
FIG. 3 is a diagrammatic view showing the detector oscillator output.

As an alternative to the fixed magnetic field generated by permanent magnet 5, an alternating or pulsed electromagnetic field generator may be used so that several cycles of magnetic field vibration occur in the closed circuit of the loop regardless of the belt velocity. An example of a device utilizing an alternating current electromagnetic field generator is illustrated in FIG. 2 in which the belt 1 moving in the direction of the arrow 14, passes over a detector pick-up 15 having a primary coil 16 and a feedback coil 17. The detector pick-up 15 is connected to a detector circuit indicated generally by the numeral 18. The detector pick-up 15 has a line 19 connected to a power line 20 and a line 21 connects the detector pick-up 15 with the input of an amplifier 22. The line 23 connects the detector pick-up 15 to ground. A capacitor 24 acts as a time delay by storing a signal pulse from the line 21 that is received from the detector 15. This time delay compensates for the space between a series of spaced apart electrically conductive sensor loops 25 positioned within the belt and running transversely thereacross. The loops 25 have positioned along one side of the belt, a pair of inverted coils 26 and 27 which correspond in position respectively to the primary coil 16 and the feedback coil 17. The reason for inverting the coils 26 and 27 with respect to each other is that such inversion provides an unnatural magnetic coupling which is not duplicated by any other objects in the environment surrounding the belt in the vicinity of the detector pick-up 15. By creating an unnatural signal within the system using this coupling, the system will not be activated by external influences which might otherwise affect the system and cause the belt to stop when in fact there is no tear in the belt. A relay driver transistor 28 is connected to the output of the amplifier 22 and conducts when the charge on condenser 24 is maintained by current pulses from the detector, thus maintaining relay 29 in a normally energized condition. When a tear or cut occurs in the belt which extends through the loop 25, the loop 25 is broken and the induced current flow in the loop stops. This condition is sensed by the detector pick-up 15 when that particular loop 25 passes across the detector pick-up. As soon as it is sensed that there is no current flowing in one of the loops 25, the charge on condenser 24 is not replenished and decays so that the relay driver transistor 28 causes relay 29 to open the normally closed switch 30 which shuts off the power from a power line 31 to the belt drive motor, thereby turning off the motor and stopping the belt and preventing any further lengthening of the tear.

Figure 6:
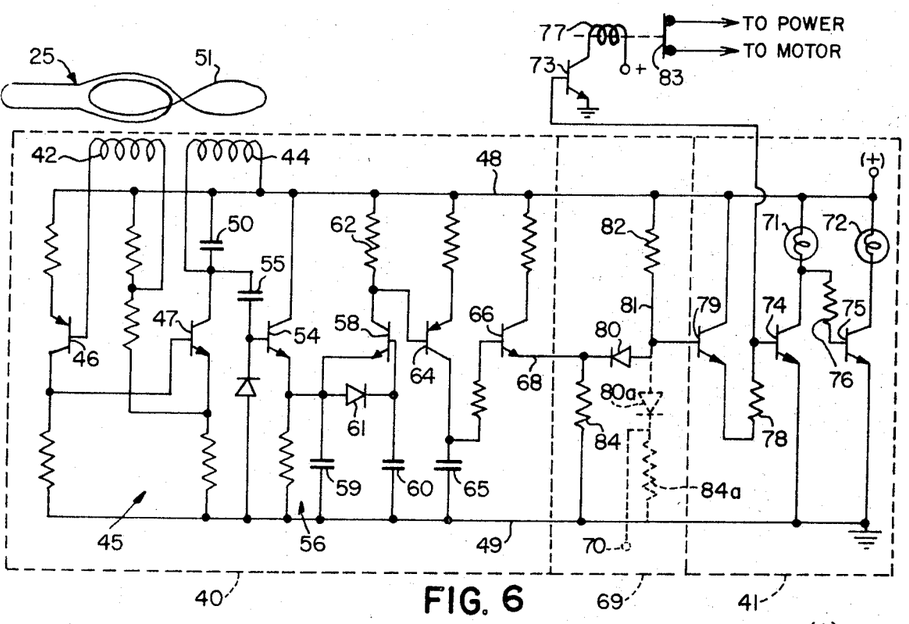
FIG. 6 is a more detailed schematic drawing showing in greater detail the circuitry which might be used to operate the embodiment shown in FIG. 2.

Referring now to FIG. 6 which shows in more detail the circuitry of the embodiment shown in FIG. 2, the components forming the detector circuit 18 and detector pick-up 15 are shown within the dash box 40.

In the detector unit 40 are a pair of coils 42 and 44 mounted in a configuration similar to the coils 16 and 17 shown in FIG. 2 and forming a part of an oscillator circuit 45 comprising transistors 46 and 47. Suitable biasing resistors are employed, and a positive potential applied on line 48 with respect to ground line 49, with positive magnetic feedback being realized between coils 42 and 44, creates a normal oscillator mode of operation for the circuit. Transistor 46 is employed for current or voltage gain purposes, receiving the feedback signal from coil 42 at the base electrode thereof and having the collector electrode directly coupled to the base electrode of oscillator transistor 47. The collector of transistor 47 in turn energizes coil 44, the latter being included in a tank circuit having capacitor 50 in shunt connection thereacross, the oscillator 45 being operative to produce a relatively high frequency signal in the normal operating mode as shown in FIG. 3.

In the presence of the sensor loop 25, however, as indicated by the incorporated figure eight loop 51, a current is induced in the right hand portion of the loop 51 from oscillator coil 44 and is coupled to the left hand portion by way of the common current to create a magnetic field of opposite sense linking coil 42. In this manner the feedback from transistor 47 to transistor 46 becomes primarily negative and oscillation of the circuit is inhibited. It is significant to note that the magnetic field induced by the sensor loop 25 is abnormal to the environment and is considerably different from that caused by the presence of a magnetically permeable object proxal to the oscillator coils 42 and 44, such type of object having the characteristic of increasing the magnetic coupling therebetween. Similarly, a simple coil whether of the single or multiple turn type in proximity to the oscillator coils 42 and 44 produces a different effect, primariy that of a shorted turn transofrmer, whereby energy is absorbed from the magnetic field linking the oscillator coils 42 and 44, but not significantly affecting the phase relationships therebetween.

It will be clear that the coils of each sensor loop 25 are brought into proximity with the oscillator coils 42 and 44 each time the belt travels a distance equal to the spacing between each loop 25, the periodicity of same depending upon the speed at which the belt travels. When the coils of the sensor loop 25 are proximate the oscillator coils 42 and 44, the effect upon the feedback energy is so great as to completely quench the oscillator 45 and to prevent any high frequency output therefrom. Upon removal of the sensor loop 25, the oscillator 45 will revert to the normal operating mode. If a tear occurs in the belt it will break the first loop 25 that it passes through. With a broken loop 25, there will be no substantial effect upon the oscillator 45 output. Thus the effect of movement of the belt is to moduate the output of the oscillator 45 at a corresponding frequency, only when all the loops 25 are unbroken, indicating that no tears have occurred in the belt 1.

The output of the oscillator 45 is applied to the demodulation portion of the detector unit 40 being coupled from the collector of transistor 47 to the base electrode of transistor 54 by capacitor 55 to control the conduction of current to the RC charging circuit 56 in the emitter path of transistor 54. The charging time of the RC circuit 56 is long with respect to the high frequency output of the oscillator 45 but short with respect to the modulation signal thereon so as to provide a negative pulse at the emitter of transistor 54 each time the sensor loop 25 passes the oscillator coils 42 and 44.

Figure 4:
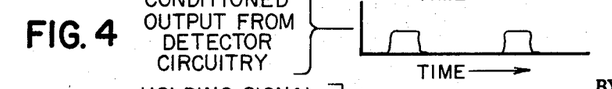
FIG. 4 is a diagrammatic view showing a conditioned output from the detector circuitry.

A comparator circuit is utilized for sensing the presence of such pulses, such circuit comprising transistor 58 having its emitter connected to the capacitor 59 in the charging circuit 56 and its base connected to a second capacitor 60, with a diode 61 connected between the capacitors 59 and 60. The DC voltage developed in the charging circuit 56 is applied by way of the diode 61 to the second capacitor 60 to develop a reference level thereacross and such diode 61 is maintained forward biased so long as the developed voltage remains at a high level. When a negative pulse, however, occurs in the charging circuit 56 due to quenching of the oscillator 45, the diode 61 is reversely biased and the charge on the second capacitor 60 creates a forward bias for transistor 58 developing a pulse of the type shown in but inverted in sense to that of FIG. 4 across its collector resistor 62. In the absence of modulation of the oscillator 45 or alternatively in the absence of the oscillator signal itself due to circuit failure or the continued presence of sensor loop 51 adjacent the oscillator coils 42 and 44, no pulse voltage will be developed at the collector of transistor 58, a comparison of the voltages across the capacitors 59 and 60 being realized approximately equal at these times.

The collector of transistor 58 is directly coupled to the base electrode of transistor 64, the latter having a capacitor 65 in the collector path thereof for developing a voltage level for control of the indicator unit 41. The capacitor 65 and associated discharge path provide a relatively long time constant so as to accumulate the pulses developed from the passage of the sensor loops 25 even at relatively low rates of belt speed, but sufficiently short so as to become discharged within the time required for the belt to move the next loop 25 into proximity with the coils 42 and 44 after a broken loop 25 has passed coils 42 and 44. The voltage thus developed across the capacitor 65 is applied to the base electrode of transistor 66, acting as a buffer amplifier, and providing a corresponding signal output on line 68 at the emitter electrode. Capacitor 65 may be a minimum value with added capacitance placed between the emitter of transistor 68 and ground to increase the holding period as specified previously in FIG. 2.

The signal on line 68 is the control signal from a single detector pick-up unit 15 and is routed to a logic circuit 69, another detector unit signal being indicated at terminal 70 for simultaneous control of the common indicator unit 41. In many instances, particularly with very long belts, it is desirable to have many sensor pick-ups 15 spaced along the belt. In the indicator unit 41, a pair of indicator devices are employed for visual interpretation of the operation of the system, the indicator devices comprising a green lamp 71 and a red lamp 72 connected respectively in the collector paths of transistor 74 and 75 which are directly coupled by way of resistor 76. Transistors 73 and 74 are in turn coupled by resistor 78 to the emitter electrode of transistor 79 which receives an input voltage from the logic circuit 69, sensitive to the conditions detected at all the detector pick-ups 15. The interconnection of transistors 74 and 75 provides alternate indications from the green lamp 71 and the red lamp 72 or alternatively, no indication in the event of power supply failure and the like. A relay 77 operating a switch 83 is connected to the collector of transistor 73 and is also maintained in an energized state when the green light circuit is energized and thereby maintains switch 83 normally closed and the belt motor circuit controlled thereby in a powered state.

Figure 5:
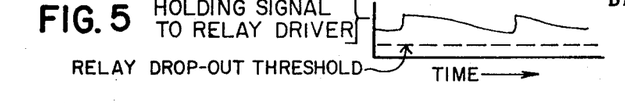
FIG. 5 is a diagrammatic view illustrating the holding signal to the relay driver of the invention and showing its relationship to the relay dropout threshold.

The logic circuit 69 comprises semi-conductor diodes 80 and 80a connected in the lines 68 and 70 emanating from the likes of detector units 15 and having anodes connected in common to line 81 for developing a voltage across base bias resistor 82. Emitter resistors 84 and 84a are included in the logic circuit 69, being connected from the cathodes of the diodes 80 and 80a to ground 49. The action of the diodes 80 and 80a in common is that of a logic AND gate requiring the presence of a positive potential at the cathode of each diode 80 and 80a, etc, to maintain the voltage on line 81 at a high level, that bias being supplied through resistor 82. If any one or more of the diodes 80 and 80a, etc, become forward biased when the signal from one of the detector units on line 68 or 70 drops to a low level, the level on line 81 will be lowered to that level and bias off transistor 79. This is shown in FIG. 5 as the relay drop-out threshold below which the holding signal to the relay driver must drop to deactivate the relay 77. Since transistor 79 normally provides bias current for transistors 73 and 74, the latter will be biased off resulting in extinguishment of the green lamp 71, deactivation of relay 77 causing normally closed switch 83 to open and shut off the belt drive motor, and raising the voltage applied to the base of transistor 75 thereby causing energization of the red lamp 72, providing an indication of a tear or slit in the belt. Normal operation of the circuit finds transistor 79 forward biased along with transistors 73 and 74, the latter drawing collector current through the green lamp 71 and providing an indication from same, the voltage drop across the green lamp 71 providing insufficient forward bias to transistor 75 causing extingusihment of the red lamp 72.

Figures 7, 8:
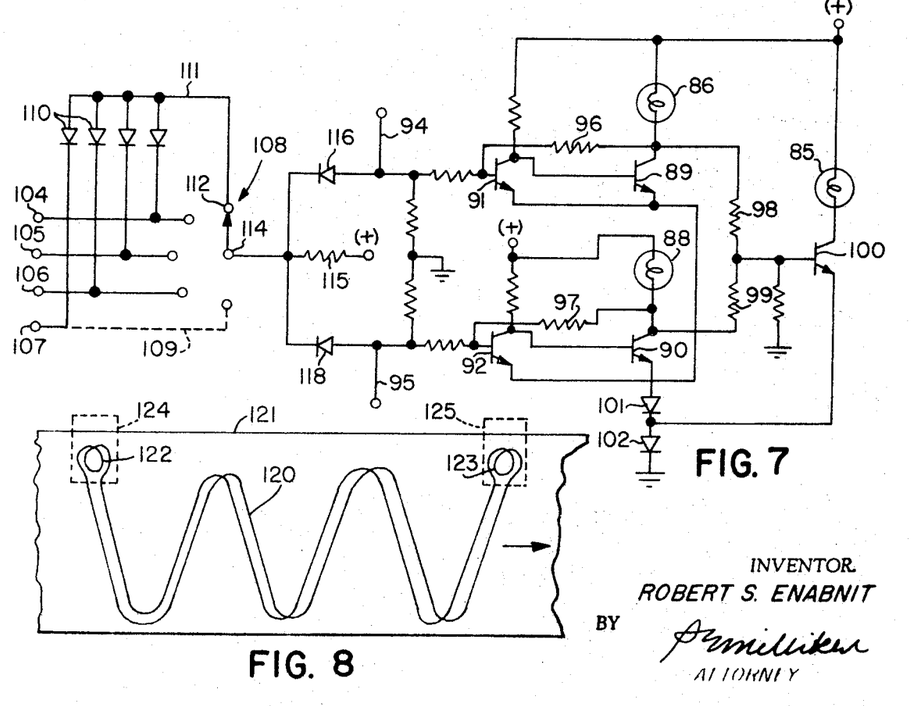
FIG. 7 is a schematic circuit diagram of another embodiment of the invention which is useful when multiple sensors are positioned at various locations along the belt's path of travel.
FIG. 8 is a diagrammatic view showing a modified form of the sensor loop in the invention.

Referring now to FIG. 7, there is shown a variation of the indicator unit and logic circuitry, particularly suited for use with multiple detectors positioned along the length of the belt. In an arrangement of this type, it is desired to have sufficient indicating devices in order to provide an adequate indication of the condition of the belt at spaced locations along its length without the system being so complex and costly as to be prohibitive for extensive use.

In this embodiment of the invention, a green lamp 85 is again provided to supply an indication of operativeness of the system in a normal running mode whereby suitable signals are received from each of the detector units in the system. A pair of red lamps 86 and 88 are utilized also, providing an individual indication for detector pick-ups at two adjudged critical different locations along the belt, and providing an indication in common of fault in the remainder of the detector pick-ups along the belt.

In a manner similar to the indicator unit 41 previously described, the red lamps 86 and 88 are connected in the collector paths of transistors 89 and 90 which transistors are directly coupled to preceding transistors 91 and 92 receiving input signals on lines 94 and 95 from two different detector pick-ups.

Thus in the presence of a positive signal on line 94 forward biasing transistor 91 and causing conduction thereof to lower the collector electrode potential, transistor 89 will be biased to an "off" condition preventing illumination of the red lamp 86 and causing the collector electrode to rise in voltage. It is noted that resistors 96 and 97 connect the collectors of transistors 89 and 90 with the bases of transistors 91 and 92 adding positive feedback to the circuit to assure saturated operation in either the conductive or cut-off conditions. The collectors of transistors 89 and 90 are connected by way of resistors 98 and 99 respectively, to the base electrode of transistor 100 controlling energization of the green lamp 85. The biasing arrangement of transistor 100 is such that it is required that both red lamps 86 and 88 be non-energized in order to forward bias transistor 100 and illuminate the green lamp 85. The emitter of transistor 100 is connected to the junction of a pair of series diodes 101 and 102 in the emitter paths of the red lamp transistors 89 and 90, such arrangement utilizing the forward voltage drop of the diodes 101 and 102 for biasing purposes.

Detector units as previously described are provided at various locations along the length of the belt and in this embodiment of the invention four input leads 104-107 for four detector units are shown. The leads are connected to various contacts of a multi-position selector switch 108, one connection 109 being indicated as optional. The leads 104-107 are connected by way of diodes 110 to a common bus 111, in turn connected to one contact 112 of the selector switch 108. The switch arm 114 in turn is connected through a resistor 115 to the positive potential bus and also by way of a pair of diodes 116 and 118 to the input lines 94 and 95 respectively.

The diodes 110 again provide an AND gate function for controlling the level of the common bus 111. The pair of diodes 116 and 118 provide primarily an isolation function and a low signal level at the arm 114 of the selector switch 108 will draw both input lines 94 and 95 to a correspondingly low level and provide a simultaneous illumination of the red lamps 86 and 88.

Thus, in operation under normal conditions, positive level signals are applied on each of the input leads 104-107 from the individual detector units and back bias the diodes 110 to render bus 111 and the selector switch arm 114 at a high potential. The position of the selector switch 108 shown in FIG. 7 is the normal running position and provides an indication of fault at any one of the detector units, which fault can then be located and its path, growth, extent, etc, determined by movement of the switch arm 114 through the various contacts. The connection of the last position of the switch to input lead 107, indicated by the dashed line 109, provides positive but redundant information and may be omitted. When any one or more of the input leads 104-107 drops to a low level, the common bus 111 will also, drawing down both input leads 94 and 95 through diodes 116 and 118, thereby causing illumination of both red lamps 86 and 88 and due to the low voltage upon the base electrode of transistor 100 and the reverse bias provided by the diode 102, preventing energization of the green lamp 85. If desired, a drive motor shut-off circuit such as transistor 73 and relay 77 which operate switch 83 in FIG. 6 may be incorporated into the circuit of FIG. 7 to perform the same function of shutting off the drive motor in case of damage to the belt.

While the sensor loop patterns shown in FIGS. 1 and 2 are used for the purpose of illustrating the invention, other loop patterns may be used without departing from the scope of the invention. For example as shown in FIG. 8, detector loop 120 may be positioned on a belt 121 in a festoon pattern along a certain section of the belt with coils 122 and 123 at each end of the loop 120. The coils 122 and 123 serve the same purpose as the coils 26 and 27 in FIG. 2. However, since coils 122 and 123 are separated from each at longitudinally spaced apart locations on the belt separate spaced apart detector sub-assemblies 124 and 125 are needed instead of the single detector unit 15 shown in FIG. 2 which has the two coils 16 and 17 in close proximity to each other. While the detectors are shown on the same edge they may be positioned on opposite edges if the coils 122 and 123 are positioned on opposite edges from each other. Various other modifications may be made in the embodiments shown herein without departing from the scope of the invention. Also, while the majority of detector circuitry shown involves an inverted magnetic coupling, it is equally evident that such field inversion is not necessary if certain desirable features be waived. For example, the detector circuit primary and feedback coils could be oriented such as to normally couple to promote negative feedback and prevent oscillation of the detector. In this case, a non-inverted belt loop would provide positive feedback when proxal to the detector coils and cause oscillation. The operation of the system would then be similar except that the modulation of the oscillator by the belt loops would be inverted from that shown and require appropriate circuit changes.

While the embodiments of the invention have been described primarily in relation to the use of the device as a damage detector it also serves the function of a misalignment detector when the belt is sufficiently out of proper alignment that the sensor loops do not coincide properly with the means for inducing the current into the sensor loops and/or with the current detector means which determines the presence of current in the sensor loops. If the belt is sufficiently out of alignment, the motor will be turned off in the same manner as if there were a break in one of the sensor loops.

I claim:
1. Apparatus for monitoring the condition of a moving belt having a driving means, the apparatus comprising:
   A. a pair of magnetically coupled coils mounted in fixed relative position to the belt;
   B. means responsive to the magnetic coupling of said pair of coils for developing an oscillatory signal;
   C. means associated with the belt for periodically reversing the magnetic coupling of said pair of coils to effect a change in the oscillatory signal; and
   D. means operatively connected to the signal developing means to detect a change in the oscillatory signal and provide an indication representative of the change.

2. The apparatus as set forth in claim 1, wherein the magnetic coupling reversing means comprises at least one close-circuited conductor mounted for movement with the belt and adapted to be open-circuited upon the occurrence of damage to the belt.

3. The apparatus as set forth in claim 2, wherein the conductor extends transverse to the longitudinal direction of the belt and includes a pair of coils on the belt in relative position to said magnetically coupled coils off of the belt to provide a reversal of the magnetic coupling of the latter.

4. The apparatus as set forth in claim 3, wherein said conductor coils are folded in a figure-eight configuration having substantially parallel coil axes in perpendicular alignment to the surface of the belt.

5. The apparatus as set forth in claim 1, wherein the means to detect a change in the oscillatory signal and provide an indication representative of the change comprises:
   a. means for developing a pulse each time a change in the oscillatory signal is effected;
   b. means connected to the pulse developing means for accumulating the pulses; and
   c. means responsive to the accumulating means to provide a signal indicative of the accumulated pulses.

6. The apparatus as set forth in claim 5, wherein the means for developing a pulse is a demodulator circuit that outputs a negative pulse signal each time a close-circuited conductor on the belt passes proximate to the magnetically coupled coils.

7. The apparatus as set forth in claim 6, wherein the means for accumulating pulses is a charging circuit having a time constant sufficiently long to develop a threshold DC voltage level, which level is maintained as long as pulses are provided by the demodulator circuit.

8. The apparatus as set forth in claim 7, wherein the means responsive to the pulse accumulating means comprises a circuit including a pair of signal lamps and a relay, one of said lamps being illuminated and the relay being close-circuited to provide power to said driving means when the DC voltage is maintained above the threshold level, the other of said lamps being illuminated and the relay being open-circuited to shut down the driving means when the DC voltage falls below the threshold level.

9. Apparatus for monitoring the condition of a moving conveyor belt having a driving means, the apparatus comprising:
   A. a pair of magnetically coupled coils mounted in stationary position relative to the belt;
   B. first circuit means operatively connected to the pair of coils to develop an output oscillatory signal in response to the magnetic coupling of the pair of coils;
   C. close-circuited conductor means carried by the belt and extending transversely across the width thereof to provide a reversal of the magnetic coupling of the pair of coils to effect a change in the oscillatory output signal of the first circuit means, said conductor means adapted to be open-circuited upon occurrence of damage to the belt; and D. second circuit means operatively connected to the output of the first circuit means and comprising:
   a. a demodulator outputting a pulse in response to the change effected in the oscillatory signal;
   b. a comparator connected to accept the output of the demodulator including a charging circuit for developing a threshold DC voltage level in response to the pulses provided by the demodulator; and
   c. an indicator circuit connected and responsive to the comparator threshold voltage to provide an indication representative of the state of the conductor carried by the moving belt.

10. The apparatus as set forth in claim 9, wherein a plurality of conductors are evenly spaced along the full length of the belt to provide periodic reversal of the magnetic coupling of the pair of coils and the comparator charging circuit has a time constant longer than the period between two successive conductors and shorter than the period to the next successive conductor such that open-circuiting of any one conductor drops the comparator voltage below the threshold level and the indication provided for by the indicator circuit is a shutdown of the belt driving means.

11. The apparatus as set forth in claim 10, wherein each conductor terminates at the edge of the belt in a pair of coils in a folded figure-eight configuration having substantially parallel coil axes in perpendicular alignment to the surface of the belt, said coils positioned relative to the stationary pair of coils to effect magnetic coupling reversal in the stationary pair of coils.

12. The apparatus as set forth in claim 9, wherein the indicator circuit includes:
   a. a pair of lamps, one of said lamps being illuminated as long as the comparator voltage is above the threshold level, the other of said lamps being illuminated when the comparator voltage drops below the threshold level; and
   b. a relay adapted to be close-circuited when the comparator voltage is above the threshold level and to be open-circuited when the voltage drops below the threshold level, said relay providing power to the driving means in its close-circuited condition.

13. Apparatus for monitoring the condition of a moving belt having a driving means, the apparatus comprising:
   A. a pair of magnetically coupled coils mounted in stationary position relative to the belt;
   B. an oscillator circuit operatively connected to the pair of coils to develop an output oscillatory signal in response to the magnetic coupling of the coils, said coils and oscillator circuit normally coupled to promote negative feedback and prevent oscillation of the circuit;
   C. conductor means carried by the belt and extending across the width thereof and adapted to be open-circuited upon the occurrence of damage to the belt, said conductor providing, in its close-circuited condition, sufficient positive feedback coupling of the pair of stationary coils to effect an output signal from said oscillator circuit; and
   D. circuit means operatively connected to the oscillator circuit to detect the presence of an output therefrom and provide an indication indicative of the close-circuited or open-circuited condition of conductor means. a power line 20 and a line 21 conects the detector pick-up 15 with the input of an amplifier 22. The line 23 connects the detctor pick-up 15 to grond. A cpacitor 24 acts as a time delay by storing a signal pulse from the line 21 that s received from the detector 15. This time delay compensates for the space between a sries of spaced apart electrically conductive sensor loops 25 positioned within the belt and running transversely thereacross. Th loops 25 have positioned along one side of the belt, a pair of inverted coils 26 and 27 which correspond in position respectively to the primary coil 16 and the feedback coil 17. The reason for inverting the coils 26 and 27 with respect to each othe is that such inversionproides an unnatural magnetic couplng which isnot duplicated by any other objects in the environment surrounding the belt in the vicinity of the detector pick-up 15. By creating an unnatural signal within the system using this coupling, the sstm will not be activated by esternal influences which might otherwise affect the system and cause the belt to stop when in fact there is no tear in the belt. A relay driver transistor 28 is connected to the output of the amplifier 22 and conducts when the charge oncondenser 24 is maintained by current pulses from the detector, thus maitaining relay 29 in a normally energized condition. When a tea o cut occus in the belt which extends through the loop 25, the loop 25 is boken and the induced current flow in the loop stops. This conditio is sensed by the detctor pick-up 15 when that particular loop 25 passes across the detector pick-up. As soon as it is sensed that there is no current flowing in one of the loops 25, the charge on condenser 24 isnot replenished and decays so that the rely driver transistor 28 causes relay 29 to open the normally closed switch 30 which shuts off the power from a power line 31 to the belt drive motor, thereby turning off the motor and stopping the belt and preventing any further lengthening of the tear.

Referring now to FIG. 6 which shows in more detail the circuitry of the embodimentshown in FIG. 2, the components forming the detector circuit 18 and detector pick-up 15 are shown witin the dash box 40.

In the detector unit 40 are a pair of coils 42 and 44 mounted in a configuration similar to the coils 16 and 17 shown in FIG. 2 and forming a part of an oscillator circuit 45 comprising trnsistors 46 and 47. Suitable biasing resistos are employed, and a positive potential applied on line 48 with respect to ground line 49, with positive magnetic feedback being realized between coils 42 and 44, creates a normal oscillatory moe of operation for the circuit. Transistor 46 is employed for current or voltage gain purposes, receiving the feedbacksignal from coil 42 at the base electrode thereof and having the collector electrode directly coupled to the base electrode of oscillator transistor 47. The collector of transistor 47 in turn energizes coil 44, the latter being included in a tnk circuit having capacitor 50 in sunt connection thereacross, the oscilltor 45 being operative to produce a relatively high frequency signal in the normal operating mode as shown in FIG. 3.

In the presence of the snsor loop 25, howevr, as indicated by the incorporated figure eightloop 51, a crrent is induced in the right hand portion of the loop 51 from oscillato coil 44 and is coupled to the left hand portion by way of the common current to creat a magnetic field of opposite sense linking coil 42. In this manner the feedback from transistor 47 to tansistor 46 becomes primarly negative and oscillation of the circuitis inibited. It is significant to note that the magnetic field induced by the snesor loop 25 is abnormal to the environment and is considerably differnt from tht caused by the presence of a magnetically permeable object proxal to the oscillator coils 42 and 44, such type of object having the characteristic of increasing the magnetic coupling therebetween. Similarly, a simple coil whether of the single or multiple turn type in proximity to the oscillator coils 42 and 44 produces a different effect, primaril that of a shorted turn transformer, whereby energy is absorbed from the magnetic field linking the oscillator coils 42 and 44, but not significantly affecting the phase relationships therebetween.

It will be clear that th coils of each sensor loop 25 are brought into proximity with the oscillator coils 42 and 44 each time the belt travels a distance equal to the spacing between each loop 25, the periodicity of same depending upon the speed at which the belt travels. Wen the coils of the sensor loop 25 are proximate the oscillator coils 42 and 44, the effect upon the feedback energy is so great as to completely quench the oscillator 45 and to prevent any high frequency output terefrom. Upon removl of the sensor loop 25, the oscillator 45 will revert to the normal operating mod. If a tear occurs in the belt it will break the first loop 25 that it passes through. Wth a broken loop 25, there will be no substantial effect upon the oscillato 45 output. Thus the effect of movement of the belt is to modulate the output of the oscillator 45 at a coresponing frequency, only when all the loops 25 are unbroken, indicating that no tears have occured in the belt 1.

The output of the oscillator 45 is applied to the demodulation portion of the detector unit 40 being coupled from the collector of transistor 47 to the base electrode of transistor 54 by capacitor 55 to control the conduction of current to the RC charging circuit 56 in the emitter path of transistor 54. The charging time of the RC circuit 56 is long with respect to the high freuency output of the oscillator 45 bt short with respect to the modulation signal thereon so as to provide a negative pulse at the emitter of transistor 54 each time the sensor loop 25 passes the oscillator coils 42 and 44.

A comparator circuit is utilized for sensing the presence of such pulses, such circuit comprising transistor 58 having its emitter connected to the capacitor 59 in the charging circuit 56 and its base connected to a second capacitor 60, with a diode 61 connected betwen the capcitors 59 and 60. The DC voltge developed in the charging circuit 56 is applied by way of the diode 61 to the second capacitor 60 to develop a reference level thereacross and such diode 6 is maintained forward biased so long as the developed voltage remains at a high level. When a negative pulse, however, occurs in the charging circuit 56 due to qunching of the oscillator 45, the diode 61 is reversely biased and the charge on the second cpacitor 60 creates a forward bias for transisto 58 developing a pulse of the type shown in but inverted in sense to that of FIG. 4 across its collector resistor 62. In the absence of modulation of the oscillator45 or alternatively in the absence of the oscillator signal itself due to circuit failre or the contnued presence of sensor loop 5 adjacent the oscillator coils 42 and 44, no pulse voltage will be developed at the collector of transisto 58, a comparison of the voltages across the capacitors 59and 60 being realized approximately equal at these times.

The collector of transistor 58 is directly coupled to the base electrode of trnsistor 64, the latter having a capacito 65 in the collector path thereof for developing a voltage level for control of the indicator unit 41. The capacitor 65 and associated discharge pat provide a relatively long time constant so as to accumulat the pulses developed from the passage of the sensor loops 25 even at relatively low rates of belt speed, but sufficiently short so as to become discharged within the time required for the belt to move the next loop 25 into proximity with the coils 42 ad 44 after a broken loop 25 has passed coils 42 and 44. The voltag thus developed acrossthe capacitor 65is appled to the base electrode of trnasisto 66, acting as a buffer amplifier, and providing a corresponding signal output on line 68 at the emitter electrode. Capacitor 65 may be a minimum value with added capacitance placed between the emitter of transistor 68 and ground to increase th holding period as specified previously in FIG. 2.

The signal on line 68 is the control signal from a single detector pick-up unit 15 and is routed to a logic circuit 69, another detector unit signal being indicated at terminal 70 forsimultaneous control of the common indicator unit 41. In many instances, particularly with very long belts, it is desirable to have many sensor pick-ups 15 spaced along the belt. In the indicator unit 41, a pair of indicator devices are employed for visual interpretation of the operation of the system, the indicator devices comprising a green lamp 71 and a red lamp 72 connected respectively in the collector paths of transistor 74 and 75 which are directly coupled by way of resistor 76. Transistors 73 and 74 are in turn coupled by resistor 78 to the emitter electrode of transistor 79 which receives an input voltge from the logic circuit 69, sensitive to the conditions detected at all the detector pick-ups 15. The interconnection of transistors 74 ad 75 provides alternate indications from the green lamp 71 andthe red lamp 72 or alternatively, no indication in the event of power supply failure and the like. A relay 77 operating a switch 83 is connectd to the collector of transistor 73 and is also maintained in an energized state when the green light circuit is energized and threby maintains switch 83 normally closed an the belt moto circuit controlled thereby in a powered state.

The logic circuit 69comprises semi-conductor diodes 80 and 80a connected in the lines 68 and 70 emanating from the likes of detector units 15 and having anodes connected in common to line 81 for dveloping a voltage across base bias resistor 82. Emitter resistors 84 and 84a are included in the logic circuit 69, being connected from the cathodes of the diodes 80 and 80a to ground 49. Th action of the diodes 80 and 80a in common is that of a logic AND gate requiring the presence of a postive potential at the cathode of each diode 80 and 80a, etc, to maintain the voltage on line 81 at a high level, that bias being supplied through resistor 82. If an or more of the diodes 80 and 80a, etc, becomes forward biased when the signal from one of the detector units on line 68 or 70 drops to a low level, the level on line 81 will be lowered to that level and bias off transistor 79. This is show in FIG. 5 as the relay drop-out threshold below which the holding signal to the relay driver must drop to deactivate the rly 77. Since transistor 79 normally provides bias current for transistors 73 and 74, the latter will be biased off resulting in extinguishment of the green lamp 71, deactivation of relay 77 causing normally closed switch 83 to open and shut off the belt drive motor, and raising the voltage applied to the base of transistor 75 thereby causing energizatio of the red lamp 72, providing an indication of a tear or slit in the belt. Normal operation of the circuit finds transistor 79 forward biased along with transistors 73 and 74, the latter drawng collector crrent through the green lamp 71 and providing an indication from same, the voltage drop across th green lamp 71 providing insufficient forward bias to transistor 75 causing extinguishment of the red lamp 72.

Referring now to FIG. 7, there is shown a variation of the indicator unit and logic circuitry, particularly suited for use with multiple detectors positioned along the length of the belt. In an arangement of this type, it is desired to have sufficient indicating devices in order to provde an adequate indication of the condition of the belt at spaced locations along ts length without the system being so complex and costly as to be prohibitive for extensive use.

In this embodiment of the invention, a green lamp 85 is again provided to supply an indication of oprativeness of the system in a normal running mode whereby suitable signals are received from each of the detector units in the system. A pair of red lamps 86 and 88 are utilized also, providing an individual indication for detector pick-ups at two adjudged critical different locations along the belt, and providing anindication in common of fault in the remainder of the detector pick-ups along the belt.

In a manner similar to the indicator unit 41 previously described, the red lamps 86 and 88 are connected in the collector paths of transistors 89 and 90 which transistors are directly coupled to preceding transistors 91 and 92 receiving input signals o lines 94 and 95 from two different detector pick-ups.

Thus in the presence of a positive signal on line 94 forward biasing transistor 91 and causing conduction thereof to lower the collector electrode potential, transistor 89 will be biased to an "off" condition preventing illumination of the red lamp 86 and causing the collector electrode to rise in voltage. It is noted that resistors 96 and 97 connect the collectos of transistors 89 and 90 with the bases of transistors 91 and 92 adding positive feedback to the circuit to assure saturated operation in either the conductive or cut-off conditions. The collectors of transistors 89 and 90 are connected by way of resistors 98 and 99 respectively, to the base electrode of transistor 100 controlling energization of the green lamp 85. The biasing arangement of transistor 100 is such that it is required that both red lamps 86 and 88 be non-energized in order to forward bias transistor 100 and illuminate the green lamp 85. The emitter of transistor 100 is connected to the junction of a pair of series diodes 101 and 102 in the emitter paths of the red lamp transistors 89 and 90, such arrangement utilizing the forward voltage drop of the diodes 101 and 102 for biasing purposes.

Detector units as previously described are provided at various locations along the length of the belt and in this embodiment of the invention four inputleads 104-107 for four detector units are shown. The leads are connected to various contacts of a multi-position selector switch 108, one connection 109 being indicated as optional. The leads 104-107 are connected by way of diodes 110 to a common bus 111, in turn connected to one contact 112 of the selector switch 108. The switch arm 114 in turn is connected through a resistor 115 to the positive potential bus and also by way of a pair of diodes 116 and 118 to the input lines 94 and 95 respectively.

The diodes 110 again provides an AND gate function for controlling the level of the common bus 111. The pair of diodes 116 and 118 provide primarily an isolation function and a low signal level at the arm 114 of the selector switch 108 will draw both input lines 94 and 95 to a corespondingly low level and proide a simultaneous illumination of the red lamps 86 and 88.

Thus, in operation under normal conditions, positive level signals are applied on each of the input leads 104-107 from the individual detector units and back bias the diodes 110 to render bus 111 and the selector switch arm 114 at a high potential. The position of the selector switch 108 shown in FIG. 7 is the normal running position and provides an indication of fault at any one of the detector units, which fault can then be located at its path, growth, extent, etc. determined by movement of the switch arm 114 through the various contacts. Th connection of the last position of the switch to input lead 107, indicated by the dashed line 109, provides positive but redundant information and may be omitted. Wen any one or more of the input leads 104-107 drops to a low level, the comon bus 111 will also, drawing down both input leads 94 and 95 through diodes 116 and 118, thereby causing illumination of both red lamps 86 and 88 and due to the low voltage upon the base electrode of transistor 100 and the reverse bias provided by the diode 102, preventing energization of th green lamp 85. If desired, drive motor shut-off circuit such as transistor 73 and relay 77 which operate switch 83 in FIG. 6 may be incorporated into the circuit of FIG. 7 to perform the same functon of shutting off the drive motor in case of damage to the belt.

While the sensor loop patters shown in FIGS. 1 and 2 are used for te purpose of illustrating the invention, other loop patterns may be usd wthout departing from the scope of the invention. For example as shown in FIG. 8, detector loop 120 may be positioned on a belt 121 in a festoon pattern along a certain section of the belt with coils 122 and 123 at each end of the loop 120. The coils 122 and 123 serve the same purpose as the coils 26 and 27 in FIG. 2. owever, since coils 122 and 123 are separted from each at longitudinally spaced apart llocations on the belt separate spaced apart detector sub-assemblies 124 and 125 are needed instead of the single detector unit 15 shown in FIG. 2 which has the two coils 16 and 17 in close proximity to each othr. While the detectors are shown on the same edge they may be positioned on opposite edges if the coils 122 and 123 are positioned on opposite edges from each other. Various other modifications may be made in the embodiments shown hrein without departing from the scope of the invention. Also, while the majority of detector circuitry shown involves an inverted magnetic coupling, it is equally evident that such field invesion is not necessary if certain desirable features be waived. For example, the detector circuit primary and feedback coils could be oriented such as to normally couple to promote negative feedback and prevent oscillation of the detector. In this case, a non-inverted belt loop would proide positive feedback when proxal to the detector coils and cause oscillation. The operation of the system would then be similar except that the modulation of the oscillator by the belt loops would be inverted from that shown and require appropriate circuit changes.

While the embodimnts of the invention have been described primarily in relation to the useof the device as a damage detector it also serves the function of a misalignment dtector when the belt is sufficiently out of proper alignment that the sensor loops do not coincide properly with the means for inducing the current into the sensor loops and/o with the current detector means which determines the presence of current in the sensor loops. If the belt is sufficiently out of alignment, the motor will be turned off in the same manner as if there were a break in one of the sensor loops.

I claim:

1. Apparatus for monitoring the condition of a moving belt having a driving means, the apparatus comprising:
   A. a pair of magnetically coupled coils mounted in fixed relative position to the belt;
   B. means responsive to the magnetic coupling of said pair of coils for developing anoscillatory signal;
   C. means associated with the belt for periodically reversing the magnetic coupling of said pair of coils to effect a chang in the oscillatory signal; and
   D. means operatively connected to the signal developing means to detect a change in the oscillatory signal and provide an indication representative of the change.

2. The apparatus as set forth in claim 1, wherein the magnetic coupling reversing means comprises at least one close-circuited conductor mounted for movement with the belt and adapted to be open-circuited upon the occurrence of damage to the belt.

3. The apparatus as set forth in claim 2, wherein the conductor extends transverse to the longitudinal direction of the blt and includes a pair of coils on the belt in relative position to said magnetically coupled coils off of the belt to provide a reversal of the magnetic coupling of the latter.

4. The apparatus as set forth in claim 3, wherein said conductor coils are folded in a figure-eight configuration having substantially parallel coil axes in perpendicular alignment to the surface of the belt.

5. The apparatus as set forth in claim 1, wherein the means to detect a change in the oscillatory signal and provide an indication representative of the change comprises:
   a. means for dveloping a pulse each time a change in the oscillatory signal is effected;
   b. means connected to the pulse developing means for accumulating the pulses; and
   c. means responsive to the accumulating means to provide a signal indicative of the accumulated pulses.

6. The apparatus as set forth in claim 5, wherein the means for developing a pulse is a demodulator circuit that outputs a negative pulse signal each time a close-circuited conductor on te belt passes proximate to the magnetically coupled coils.

7. The apparatus as set forth in claim 6, wherein the means for accumulting pulses is a charging circuit having a time constant sufficiently long to develop a threshold DC voltage level, which level is mtaintained as long as pulses are provided by the demodulator circuit.

8. The apparatus as set forth in claim 7, wherein the means responsive to the pulseaccumulating means comprises a circuit incluing a pair of signal lamps and a relay, one of said lamps being illuminated and the relay being clos-circuited to provide power to said driving means when the DC voltage is maintained above the threshold level, the other of said lamps beingilluminated and the relay being open-circuited to shut dow the driving means when the DC voltage falls below the threshold level.

9. Apparatus for monitoring the condition of a moving conveyor belt having a driving means, the apparatus comprisig:
   A. a pair of magnetically coupled coils mounted in stationary position relative to the belt;
   B. first circuit means operatively connected to the pair of coils to develop an output oscillatory signl in response to the magnetic coupling of the pair of coils;
   C. close-circuited conductor means carried by the belt and extending transversely across the width thereof to provide a reversal of the magnetic coupling of the pair of coils to effect a change in the oscillatory output signal of the first circuit means, said conductor means adapted to be open-circuited upon occurrence of damage to the belt; and
   D. second circuit means operatively connected to the output of the first circuit means and comprising:
      a. a demodulator outputting a pulse in response to the change effected in the oscillatory signal;
      b. a comparator connected to accept the output of the demodulator including a charging circuit for developing a threshold DC voltage level in response to the pulses provided by the demodulator; and
      c. an indicator circuit connected and responsive to the comparator threshold voltage to provide an indication representative of the state of the conductor carried by the moving belt.

10. The apparatus as set forth in claim 9, wherein a plurality of conductors are evenly spaced along the full length of th belt to provide periodic reversal of the magnetic coupling of the pair of coils an the comparator charging circuit has a time constant longer than the period between two successive conductors and shorter than the period to the next successive conductor such that open-circuiting of any one conductor drops the comparator voltage below the threshold level and the indication provided for by the indicator circuit is a shutdown of the belt driving means.

11. The apparatus as set forth in claim 10, wherein each conductor terminates at the edge of the belt in a pair of coils in a folded figure-eight configuration having substantially parallel coil axes in perpendicular alignment to the surface of the belt, said coils positioned relative to the stationary pair of coils to effect magnetic coupling reversal in the stationary pair of coils.

12. The apparatus as set forth in claim 9, wherein the indicator circuit includes:
   a. a pair of lamps, one of said lamps being illuminated as long as the comparator voltage is above th threshold level, the other of said lamps being illuminated when the comparator voltage drops below the threshold level; and
   b. a relay adapted to be close-circuited when the comparator voltage is above the threshold level and to be open-circuited when the voltage drops below the threshold level, said relay providing power to the driving means in its close-circuited condition.

13. Apparatus for monitoring the condition of a moving belt hvig a driving means, the apparatus comprising:
A. a pair of magnetically coupled coils mounted in stationary position relative to the belt;
B. an oscillator circuit operatively connected to the pair of coils to develop an output oscillatory signal in response to the magnetic coupling of the coils, said coils and oscillator circuit normally coupled to promote negative feedback and prevent oscillation of the circuit;
C. conductor means carried by the belt and extending across the width thereof and adapted to be open-circuited upon the occurrence of damage to the belt, said conductor poviding, in its close-circuited condition, sufficient positive feedback coupling of the pair of stationary coils to effect an output signal from said oscillator circuit; and
D. circuit means operatively connected to the oscillator circuit to detect the presence of an output therefrom and provide an indication indicative of the close-circuited or open-circuited condition of conductor means.

* * * * *

UNITED STATES PATENT OFFICE
CERTIFICATE OF CORRECTION

Patent No. 3,742,477        Dated June 26, 1973

Inventor(s) Robert S. Enabnit

It is certified that error appears in the above-identified patent and that said Letters Patent are hereby corrected as shown below:

Column 10, line 1, beginning with "a power line 20" cancel all to and including "conductor means." in column 18, line 13.

Signed and sealed this 1st day of January 1974.

(SEAL)
Attest:

EDWARD M. FLETCHER, JR.
Attesting Officer

RENE D. TEGTMEYER
Acting Commissioner of Patents